US008027507B2

(12) United States Patent
Levy

(10) Patent No.: US 8,027,507 B2
(45) Date of Patent: *Sep. 27, 2011

(54) METHOD AND APPARATUS FOR EMBEDDING AUXILIARY INFORMATION WITHIN ORIGINAL DATA

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,693

(22) Filed: May 12, 2009

(65) Prior Publication Data

US 2009/0279735 A1    Nov. 12, 2009

Related U.S. Application Data

(63) Continuation of application No. 11/691,938, filed on Mar. 27, 2007, now Pat. No. 7,532,740, and a continuation of application No. 09/404,292, filed on Sep. 23, 1999, now Pat. No. 7,197,156.

(60) Provisional application No. 60/101,851, filed on Sep. 25, 1998, provisional application No. 60/110,683, filed on Dec. 2, 1998, provisional application No. 60/114,725, filed on Dec. 31, 1998, provisional application No. 60/126,591, filed on Mar. 26, 1999.

(51) Int. Cl.
*G06K 9/00* (2006.01)
(52) U.S. Cl. .......... 382/100; 382/277; 382/278
(58) Field of Classification Search ............ 382/232, 382/240, 100, 277, 278; 380/51, 54
See application file for complete search history.

(56) References Cited

U.S. PATENT DOCUMENTS

| | | |
|---|---|---|
| 3,868,193 A | 2/1975 | Schott |
| 4,237,484 A | 12/1980 | Brown |
| 4,528,588 A | 7/1985 | Lofberg |
| 4,979,210 A | 12/1990 | Nagata et al. |
| 5,450,490 A | 9/1995 | Jensen et al. |
| 5,471,533 A | 11/1995 | Wang et al. |
| 5,510,900 A | 4/1996 | Shirochi et al. |
| 5,613,004 A | 3/1997 | Cooperman et al. |
| 5,636,292 A | 6/1997 | Rhoads |
| 5,646,997 A | 7/1997 | Barton |
| 5,652,626 A | 7/1997 | Kawakami |
| 5,659,726 A | 8/1997 | Sandford, II |

(Continued)

FOREIGN PATENT DOCUMENTS

EP    0581317    2/1994

(Continued)

OTHER PUBLICATIONS

U.S. Appl. No. 09/480,391, filed Jan. 11, 2000, Tewfik.

(Continued)

*Primary Examiner* — Yosef Kassa

(57) ABSTRACT

This patent application is generally related to watermarking and steganography. One claim recites a method of transmarking a media signal previously embedded with a first digital watermark using a first digital watermark embedding method. The method includes: utilizing a programmed electronic processor, detecting the first digital watermark in the media signal; converting the media signal to a different format; utilizing a programmed electronic processor, embedding detected message information from the first digital watermark into a second digital watermark in the converted media signal such that the second digital watermark is adapted to robustness or perceptibility parameters associated with the new format. Of course, other combinations and claims are provided as well.

18 Claims, 9 Drawing Sheets

U.S. PATENT DOCUMENTS

| | | | |
|---|---|---|---|
| 5,719,937 A | 2/1998 | Warren et al. | |
| 5,721,778 A | 2/1998 | Kubota et al. | |
| 5,727,092 A | 3/1998 | Sandford, II | |
| 5,748,763 A | 5/1998 | Rhoads | |
| 5,809,139 A | 9/1998 | Girod et al. | |
| 5,832,119 A | 11/1998 | Rhoads | |
| 5,841,886 A | 11/1998 | Rhoads | |
| 5,841,978 A | 11/1998 | Rhoads | |
| 5,901,224 A | 5/1999 | Hecht | |
| 5,915,027 A | 6/1999 | Cox et al. | |
| 5,943,422 A | 8/1999 | Van Wie et al. | |
| 5,956,716 A | 9/1999 | Kenner et al. | |
| 5,963,909 A | 10/1999 | Warren et al. | |
| 5,974,548 A | 10/1999 | Adams | |
| 6,078,664 A | 6/2000 | Moskowitz et al. | |
| 6,122,403 A | 9/2000 | Rhoads | |
| 6,131,161 A | 10/2000 | Linnartz | |
| 6,141,753 A | 10/2000 | Zhao et al. | |
| 6,154,571 A | 11/2000 | Cox et al. | |
| 6,185,312 B1 | 2/2001 | Nakamura | |
| 6,192,138 B1 | 2/2001 | Yamadaji | |
| 6,208,745 B1 | 3/2001 | Florencio | |
| 6,233,347 B1 | 5/2001 | Chen et al. | |
| 6,233,684 B1 | 5/2001 | Stefik et al. | |
| 6,243,480 B1 | 6/2001 | Zhao et al. | |
| 6,246,777 B1 | 6/2001 | Agarwal | |
| 6,263,087 B1 | 7/2001 | Miller | |
| 6,266,419 B1 | 7/2001 | Lacy | |
| 6,266,430 B1 | 7/2001 | Rhoads | |
| 6,272,176 B1 | 8/2001 | Srinivasan | |
| 6,272,634 B1 | 8/2001 | Tewfik et al. | |
| 6,275,599 B1 | 8/2001 | Adler | |
| 6,278,791 B1 | 8/2001 | Honsinger | |
| 6,282,654 B1 | 8/2001 | Ikeda et al. | |
| 6,285,774 B1 | 9/2001 | Schumann | |
| 6,285,775 B1 | 9/2001 | Wu | |
| 6,286,036 B1 | 9/2001 | Rhoads | |
| 6,301,368 B1 | 10/2001 | Bolle | |
| 6,310,962 B1 | 10/2001 | Chung et al. | |
| 6,311,214 B1 | 10/2001 | Rhoads | |
| 6,330,672 B1 | 12/2001 | Shur | |
| 6,351,439 B1 | 2/2002 | Miwa | |
| 6,351,815 B1 | 2/2002 | Adams | |
| 6,366,685 B1 | 4/2002 | Takaragi | |
| 6,374,036 B1 | 4/2002 | Ryan | |
| 6,404,898 B1 | 6/2002 | Rhoads | |
| 6,408,330 B1 | 6/2002 | DeLahuerga | |
| 6,421,450 B2 | 7/2002 | Nakano | |
| 6,424,726 B2 | 7/2002 | Nakano | |
| 6,425,081 B1 | 7/2002 | Iwamura | |
| 6,434,253 B1 | 8/2002 | Hayashi | |
| 6,434,561 B1 | 8/2002 | Durst, Jr. | |
| 6,437,933 B1 | 8/2002 | Sugiyama et al. | |
| 6,453,304 B1 | 9/2002 | Manabu | |
| 6,463,162 B1 | 10/2002 | Vora | |
| 6,473,516 B1 | 10/2002 | Kawaguchi | |
| 6,480,607 B1 | 11/2002 | Kori | |
| 6,490,681 B1 | 12/2002 | Kobayashi | |
| 6,493,457 B1 | 12/2002 | Quackenbush | |
| 6,504,571 B1 | 1/2003 | Narayanaswami et al. | |
| 6,505,160 B1 | 1/2003 | Levy et al. | |
| 6,535,614 B1 | 3/2003 | Kimura | |
| 6,574,350 B1 | 6/2003 | Rhoads et al. | |
| 6,577,744 B1 | 6/2003 | Braudaway et al. | |
| 6,587,821 B1 | 7/2003 | Rhoads | |
| 6,587,944 B2 | 7/2003 | Yeung et al. | |
| 6,590,997 B2 | 7/2003 | Rhoads | |
| 6,614,914 B1 | 9/2003 | Rhoads et al. | |
| 6,651,121 B1 * | 11/2003 | Zurawski et al. | 710/100 |
| 6,687,383 B1 | 2/2004 | Kanevsky et al. | |
| 6,738,491 B1 | 5/2004 | Ikenoue et al. | |
| 6,757,407 B2 | 6/2004 | Bruckstein et al. | |
| 6,775,381 B1 | 8/2004 | Nelson et al. | |
| 6,807,285 B1 | 10/2004 | Iwamura | |
| 6,829,368 B2 | 12/2004 | Meyer et al. | |
| 6,850,956 B1 * | 2/2005 | Knutson | 1/1 |
| 6,865,676 B1 | 3/2005 | Staring et al. | |
| 6,868,193 B1 * | 3/2005 | Gharbia et al. | 382/305 |
| 6,868,793 B2 | 3/2005 | Hoffman et al. | |
| 6,869,023 B2 | 3/2005 | Hawes | |
| 6,925,593 B1 * | 8/2005 | Knutson et al. | 715/222 |
| 6,940,993 B2 | 9/2005 | Jones et al. | |
| 7,000,223 B1 | 2/2006 | Knutson et al. | |
| 7,020,303 B2 | 3/2006 | Levy et al. | |
| 7,020,304 B2 | 3/2006 | Alattar et al. | |
| 7,027,614 B2 | 4/2006 | Reed | |
| 7,046,820 B2 | 5/2006 | Yu | |
| 7,055,034 B1 | 5/2006 | Levy | |
| 7,092,910 B2 | 8/2006 | Iwamura | |
| 7,095,871 B2 | 8/2006 | Jones et al. | |
| 7,096,238 B2 | 8/2006 | Garthwaite | |
| 7,120,800 B2 * | 10/2006 | Ginter et al. | 713/193 |
| 7,123,718 B1 * | 10/2006 | Moskowitz et al. | 380/205 |
| 7,130,461 B2 * | 10/2006 | Rosenholtz | 382/165 |
| 7,136,066 B2 * | 11/2006 | Li et al. | 345/428 |
| 7,171,018 B2 | 1/2007 | Rhoads et al. | |
| 7,197,156 B1 | 3/2007 | Levy | |
| 7,212,649 B2 * | 5/2007 | Watanabe et al. | 382/100 |
| 7,333,957 B2 | 2/2008 | Levy et al. | |
| 7,349,552 B2 | 3/2008 | Levy et al. | |
| 7,373,513 B2 | 5/2008 | Levy | |
| 7,379,067 B2 * | 5/2008 | Deering et al. | 345/506 |
| 7,391,472 B1 * | 6/2008 | Woodall | 348/498 |
| 7,425,981 B2 * | 9/2008 | Kamariotis | 348/14.13 |
| 7,461,136 B2 | 12/2008 | Rhoads | |
| 7,505,605 B2 | 3/2009 | Rhoads et al. | |
| 7,532,740 B2 | 5/2009 | Levy | |
| 7,545,951 B2 | 6/2009 | Davis et al. | |
| RE40,919 E | 9/2009 | Rhoads | |
| 7,590,259 B2 | 9/2009 | Levy et al. | |
| 7,593,576 B2 | 9/2009 | Meyer et al. | |
| 7,650,010 B2 | 1/2010 | Levy et al. | |
| 7,711,564 B2 | 5/2010 | Levy et al. | |
| 7,953,981 B2 | 5/2011 | Moskowitz | |
| 2001/0016052 A1 | 8/2001 | Miller | |
| 2001/0017885 A1 | 8/2001 | Asai et al. | |
| 2001/0020193 A1 | 9/2001 | Teramachi | |
| 2001/0021144 A1 | 9/2001 | Oshima et al. | |
| 2001/0021260 A1 | 9/2001 | Chung et al. | |
| 2001/0024510 A1 | 9/2001 | Iwamura | |
| 2001/0026618 A1 | 10/2001 | Van Wie et al. | |
| 2001/0028725 A1 | 10/2001 | Nakagawa et al. | |
| 2001/0028727 A1 | 10/2001 | Naito et al. | |
| 2001/0033674 A1 | 10/2001 | Chen | |
| 2001/0036270 A1 | 11/2001 | Lacy et al. | |
| 2001/0037456 A1 | 11/2001 | Levy | |
| 2001/0044899 A1 | 11/2001 | Levy | |
| 2001/0054150 A1 | 12/2001 | Levy | |
| 2002/0002412 A1 | 1/2002 | Gunji et al. | |
| 2002/0015042 A1 | 2/2002 | Robotham et al. | |
| 2002/0027994 A1 | 3/2002 | Katayama et al. | |
| 2002/0029338 A1 | 3/2002 | Bloom et al. | |
| 2002/0030907 A1 | 3/2002 | Ikeda et al. | |
| 2002/0036800 A1 | 3/2002 | Nozaki et al. | |
| 2002/0037091 A1 | 3/2002 | Terasaki | |
| 2002/0040323 A1 | 4/2002 | Lee et al. | |
| 2002/0040433 A1 | 4/2002 | Kondo | |
| 2002/0049580 A1 | 4/2002 | Kutaragi et al. | |
| 2002/0064298 A1 | 5/2002 | Rhoads et al. | |
| 2002/0071556 A1 | 6/2002 | Moskowitz et al. | |
| 2002/0078178 A1 | 6/2002 | Senoh | |
| 2002/0080997 A1 | 6/2002 | Rhoads | |
| 2002/0083324 A1 | 6/2002 | Hirai | |
| 2002/0097891 A1 | 7/2002 | Hinishi | |
| 2002/0106082 A1 | 8/2002 | Kori et al. | |
| 2002/0107803 A1 | 8/2002 | Lisanke et al. | |
| 2002/0114456 A1 | 8/2002 | Sako | |
| 2002/0124173 A1 | 9/2002 | Stone | |
| 2002/0133818 A1 | 9/2002 | Rottger | |
| 2002/0150165 A1 | 10/2002 | Huizer | |
| 2002/0164048 A1 | 11/2002 | Bruckstein | |
| 2003/0035565 A1 | 2/2003 | Rhoads | |
| 2003/0101141 A1 | 5/2003 | Iwamura | |
| 2003/0185417 A1 | 10/2003 | Alattar | |
| 2004/0015362 A1 | 1/2004 | Rhoads | |
| 2004/0022412 A1 | 2/2004 | Iwamura et al. | |

| | | | |
|---|---|---|---|
| 2004/0101137 | A1 | 5/2004 | Koto et al. |
| 2004/0117629 | A1 | 6/2004 | Koto et al. |
| 2008/0249961 | A1 | 10/2008 | Harkness et al. |

FOREIGN PATENT DOCUMENTS

| | | |
|---|---|---|
| EP | 0901282 | 3/1999 |
| EP | 0906700 | 4/1999 |
| EP | 1156662 | 7/2000 |
| WO | WO9626494 | 8/1996 |
| WO | WO09743736 | 11/1997 |
| WO | WO 9827510 | 6/1998 |
| WO | WO 99/18723 | 4/1999 |
| WO | WO 00/48154 | 8/2000 |
| WO | WO 00/54453 | 9/2000 |
| WO | WO01/71960 | 9/2001 |
| WO | WO 0171960 | 9/2001 |
| WO | WO01/76253 | 10/2001 |
| WO | WO02/03385 | 1/2002 |
| WO | WO02/37489 | 5/2002 |

OTHER PUBLICATIONS

U.S. Appl. No. 60/101,851, filed Sep. 25, 1998, Levy.

U.S. Appl. No. 60/110,683, filed Dec. 2, 1998, Levy.

U.S. Appl. No. 60/114,725, filed Dec. 31, 1998, Levy.

U.S. Appl. No. 60/126,591, filed Mar. 26, 1999, Levy.

U.S. Appl. No. 60/123,587, filed Mar. 10, 1999, Levy.

U.S. Appl. No. 60/126,592, filed Mar. 26, 1999, Levy.

U.S. Appl. No. 60/190,481, filed Mar. 18, 2000, Levy et al.

Boland et al,, "Watermarking Digital Images for Copyright Protection," Jul, 1995, Fifth International Conference on Image Processing and its Applications, Conf. Publ. No. 410. pp. 326-330.

Bors et al., "Image Watermarking Using DCT Domain Constraints," Sep. 1996, Proc. IEEE Int. Conf. On Image Processing, vol. 3, pp. 231-234.

Hartung et al,, Digital Watermarking of Raw and Compressed Video, Proc. SPIE 2952, Digital Compression Technologies and Systems for Video Communications, Oct. 1996, pp. 205-213.

Holliman el al , "Adaptive Public Watermarking of DCT-Based Compressed Images," Dec. 1997, SPIE vol. 3312, pp. 284-295.

Hsu et al., "Hidden Signatures in Images," Sep. 1996, Proc. IEEE Int. Conf. On Image Processing, vol. 3, pp. 223-226.

Kim, W.G., et at., "A watermarking scheme for both spatial and frequency domain to ectract the seal image without the original image," Proc. 5.sup.th Int. Symp. On Signal Processing and its Applications, Aug. 1999, pp. 293-296.

Koch, "Copyright Protection for Multimedia Data," Dec. 1994, Proc. Of the Int. Conf. On Digital Media and Electronic Publishing, Leeds, U.K., 15 pages.

Komatsu, "A Proposal on Digital Watermark in Document Image Communication and Its Application to Realizing a Signature," Nov. 1990, Electronics and Communications in Japan, Part 1, vol. 73, No. 5, pp. 22-33. Komatsu, "Authentication System Using Concealed Image in Telematics," Oct. 1998, Memoirs of the School of Science and Engineering, Waseda Univ., No. 52, pp. 45-60.

Macq, "Cryptology for Digital TV Broadcasting," Proceedings of the IEEE, vol. 83, No. 6, Jun. 1995, pp. 944-957.

Matsui, "Video-Steganography: How to Secretly Embed a Signature in a Picture," Apr. 1993, Proc. Technological strategies for Protecting Intellectual Property in the Networked Multimedia Environment, vol. 1, issue 1, Jan. 1994, pp. 187-205.

Mintzer et al., "Safeguarding Digital Library Contents and Users," D-Lib Magazine, Dec. 1997, 12 pages.

Ohnishi J. et al., "A method of watermarking with multiresolution analysis and pseudo noise sequence," Systems and Computers in Japan, vol. 29, No. 5, May 1998, pp. 11-19.

Tanaka, "A Visual Retrieval System With Private Information for Image Database," Oct. 1991, Proceeding Int. Conf. On DSP Applications and Technology, 415-421.

Zhao et al, "Embedding Robust Labels into Images for Copyright Protection," Aug. 1995, Proc. Of the International Congress on Intellectual Property Rights for Specialized Information, Knowledge and New Technologies, 10 pages.

Aug. 10, 2004 Office Action; Dec. 10, 2004 Amendment in response thereto; May 4, 2005final Office Action; May 31, 2006 Final Office Action; Jun. 27, 2006 Amendment After Final; Nov. 3, 2006 Office Action; Interview Summary (PTO-413) summarizing an interview conducted on Nov. 15, 2006; and Nov. 27, 2006 Amendment in Response thereto; Mar. 7, 2007 Notice of Allowance all in U.S. Appl. No. 09/810,080 (now U.S. Patent No. 7,373,513).

Dec. 8, 2004 non-final Office Action; May 11, 2005 Amendment; Sep. 2, 2005 Amendment; Aug. 25, 2008 Notice of Allowance, all from U.S. Appl. No. 08/404,292 (now U.S. Patent No. 7,197,156).

European Search Report in EP 01 92 0399 (European National Phase of PCT/US01/08315, published as WO 01/71960).

International Search Report from PCT US01/08315 (published as WO 01/71960), dated Jul. 3, 2001 (2 pages).

* cited by examiner

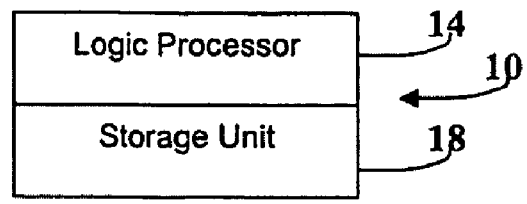
Fig. 2
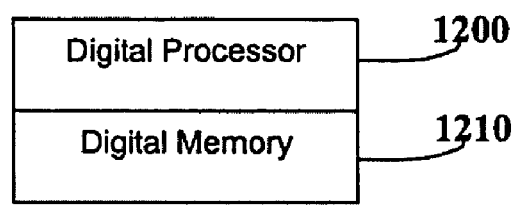
Fig. 12
| A to D Converter | Sample and Hold | D to A Converter |
|---|---|---|
| Comparator | PLC | Delays |
Fig 13

METHOD AND APPARATUS FOR EMBEDDING AUXILIARY INFORMATION WITHIN ORIGINAL DATA

This application is a continuation of U.S. patent application Ser. No. 11/691,938, filed Mar. 27, 2007, now U.S. Pat. No. 7,532,740, which is a continuation of U.S. patent application Ser. No. 09/404,292, filed Sep. 23, 1999, now U.S. Pat. No. 7,197,156. Each of the above patent documents is hereby incorporated by reference.

The Ser. No. 09/404,292 application claims the benefit of Provisional Patent Application Nos. 60/101,851, filed Sep. 25, 1998; 60/110,683, filed Dec. 2, 1998; 60/114,725, filed Dec. 31, 1998; and 60/126,591, filed Mar. 26, 1999, each of which are hereby incorporated by reference.

This application also relates to U.S. Provisional Patent Application Nos. 60/123,587, filed Mar. 10, 1999 and 60/126,592, filed Mar. 26, 1999, each of which are hereby incorporated herein by reference. The application also relates to U.S. patent application Ser. No. 09/404,291, filed Sep. 23, 1999, now U.S. Pat. No. 7,055,034, hereby incorporated by reference.

FIELD OF THE INVENTION

This invention relates to the field of signal processing, and more specifically, to techniques for hiding auxiliary information within original data.

BACKGROUND OF THE INVENTION

With the recent explosive growth in the use of electronic information, enforcement of copyright laws has become more difficult. The cost of the equipment required to copy digital data representing music, art, and other valuable information has been decreasing, while the capacity of readily available data storage media has been increasing. Inexpensive devices can write enormous amounts of data to digital storage media such as writable compact disks (CD-R or CD-RWs), multi-gigabyte hard disk drives, high capacity removable magnetic disks, and soon to be available digital versatile disks (DVDs). Readily available high-resolution printers and scanners bring the digitization and reproduction of graphic information within the means of most consumers. In addition, readily available high-resolution sound cards, including analog-to-digital and digital-to-analog converters, bring the digitization and reproduction of audio information within the means of most consumers. Not only is copying digital files simple and inexpensive, the Internet facilitates unauthorized distribution of copyrighted works.

Unlike analog copies, which are always inferior to the original, a copy of digital information can be identical to that of the original, with no degradation due to copying. Millions of dollars are lost annually due to illegal but exact duplications of digital media and near-exact duplications of analog media. Because copying equipment is readily available, catching persons making unauthorized copies can be difficult. Even if an unauthorized copier is apprehended, the creator of the original document must still prove that the allegedly unauthorized copy was in fact copied from his original work and not independently created.

One approach to solving the problem of illegal copying is embedding or hiding authentication information or copy protection information within the original data. Hiding auxiliary information in original data, also called steganography, has been used for thousands of years. In steganography, a message is hidden within another object or media, so that the message is minimally perceived by an observer. Steganography is related to, but different from, cryptography, in which the existence of a message is typically obvious, but its meaning is not ascertainable without special knowledge.

Hidden data, also referred to as auxiliary or embedded data, can be used to prevent unauthorized copying by embedding in the original data commands that are readable by the copying device and that instruct the copying device not to make a usable copy. Hidden data can also be used to authenticate data, that is, to prove authorship. One such technique entails embedding auxiliary information in an original work in such a manner that special knowledge, such as a secret algorithm or code, is required to detect and/or remove the auxiliary information. The copier would not be able to remove the authentication information, and the original creator could prove his authorship by retrieving the embedded information, which would identify him as the author.

Data hiding has uses besides the prevention and detection of unauthorized copying. One such use is content enhancement, that is, adding information to the original data to enhance the content. For example, lyrics could be embedded in audio data on a CD. The lyrics could be viewed in a special karaoke machine, while the audio could be played on an existing CD player. Hidden data could also be used to associate different segments of video data with different viewer-selectable versions of the video on a DVD. For example, a viewer could select between a version edited for children or an unabridged version, and embedded auxiliary data would indicate to the DVD player which video segments to skip and which to include for the selected version.

The original data in which the auxiliary data is hidden may represent any type of information that is perceivable with the aid of a presenting device. For example, the data may represent music which is presented using a compact disk or audio DVD player, a video film that is presented on a DVD player, or an image that is presented on a computer screen or a printer.

When the combined data is presented to a user by a normal presentation device, the auxiliary data should not interfere with the use of the original data. Ideally, the user should not be able to perceive the auxiliary data at all. Unfortunately, increasing the amount of the embedded auxiliary data or its robustness, that is, its persistence to attack and data transformation, may incidentally increase its perceptibility. The degree to which the auxiliary data can be perceived without having an adverse impact on the user varies with the application. For example, in CD quality audio, a minor change from the original data might result in unacceptable audio artifacts. In video data, a minor change in a presented image may be acceptable, even though the change might be noticeable if the original and combined works are presented and compared side by side.

Several techniques are known for hiding auxiliary information in original digital data. Data can be hidden in original data as headers or trailers appended to the original data. Such techniques are of limited use in protection of copyrighted works, because the auxiliary data is easily located and stripped out of the copy, as when changing format. More sophisticated techniques distribute the auxiliary data through the original data, entwining the auxiliary and original data until the auxiliary data is difficult, or even statistically impossible, to identify and strip from the the combined data.

Most data hiding techniques that distribute the auxiliary data through the original data are computationally intense and therefore expensive to implement. Many of these techniques are based upon adding or subtracting periods of pseudo-random noise (PN) sequences with the signal to represent the auxiliary information, and these sequences may require filtering (a.k.a. shaping) in the frequency domain. The rest are based upon adding the auxiliary information to the original data after the original data has been transformed into the frequency domain, such as by a Fourier transform. Auxiliary information can be added in the frequency domain so that the energy of the auxiliary data is spread across many frequencies in a manner similar to that of the PN sequence. In addition, auxiliary information can be added to the phase of the frequency components with and without spreading the information across frequencies. Unfortunately, transforming the data into the frequency domain and/or shaping the energy of the PN sequence so it is less perceivable requires intense calculations.

The ability of users to detect auxiliary data depends not only upon the data, but also upon the characteristics of the human sense organs and the interpretation of sensory stimuli by the brain. Some data hiding techniques transform the original data into the frequency domain and embed auxiliary data in a manner such that the frequency spectrum of the original data reduces the perception of embedded data. This psychophysical effect is known as masking. The frequency distribution of the original data is used to determine preferred frequencies at which the embedded auxiliary data will be less perceptible, that is, masked. Others use the fact that we don't perceive phase as accurately as magnitude in the frequency domain.

There are some data embedding techniques that are less computationally intense and that still distribute the auxiliary data in the original data. Such techniques include amplitude modulation, frequency band elimination, distinct quantization, and least-significant bit (LSB) replacement. These techniques embed data in predetermined locations without regard to the original data and are, therefore, more likely to produce perceptual side affects in the combined data. In addition, the LSB replacement technique is easily disturbed by low level noise.

The ease of retrieving embedded data varies with the technique used for embedding. Some data hiding and retrieving techniques retrieve the auxiliary data by comparing the combined data with the original data. Others retrieve the auxiliary information using databases of the PN sequences that were originally used to hide the data. Techniques that require that a copy of the original data or a PN database be used to extract the auxiliary data are of limited use in applications in which the combined data is distributed broadly. Such techniques are useful in some applications, such as data authentication, in which the auxiliary data is retrieved rarely and only by the copyright owner.

Thus, it would be desirable to have a data hiding and extracting technique that is not computationally intense and that maintains a desired level of perceptibility and robustness, and in which the embedded data that can be retrieved from the combined data without access to the original data.

SUMMARY OF THE INVENTION

Accordingly, it is an object of the present invention to provide a method and apparatus of data hiding and retrieval.

An advantage of the present invention is its extreme efficiency relative to the prior art. Thus, the apparatus is less expensive.

Another advantage of the invention is that it does not require the original file or other database for extracting the auxiliary data.

Another advantage of the invention is that it uses an adaptive algorithm based upon psychophysics. Specifically, the invention uses the original data, in unmodified form or without complex data transformations, to determine the location to insert auxiliary data.

A further advantage of the invention is that, in some embodiments, the embedded data can be imperceptible when presented with existing players.

Still another advantage of the invention is that usually it uses a broadband approach that distributes the auxiliary data through the original data, thereby making the auxiliary data more difficult to detect and remove.

Yet another advantage of the invention is that it provides for a minimal decrease in signal-to-noise ratio (SNR) of the combined data as compared to the original data.

Still a further advantage of the invention is that it provides non-LSB capabilities, thereby providing increased robustness, that is, the auxiliary data is unchanged by some transformations of the combined data.

Yet a further advantage of the invention is that it can cause no detectable change in data's statistics, thereby making authentication information impossible to identify.

Still another advantage of the invention is its versatility, in that it allows the user to set parameters that vary the perceptibility, robustness, and embedding rate so that the invention can be used in a broad variety of applications.

The apparatus for the present invention includes a logic processor and storage unit, such as those that come with the standard computer or on DSP boards. These devices will act as data readers, comparer and data writers, such the user's desired watermark can be embedded and/or retrieved.

The process involves embedding and retrieving auxiliary information into original data to produce combined data. The invention uses a detection criterion or criteria to determine where in the original data to locate and adjust data points to carry the auxiliary information. The detection criteria is used to locate positions, referred to as local masking opportunities, in the original data at which the embedding of auxiliary data will produce less perception, as compared to other simplistic processes. When embedding the auxiliary data, the data points in the original data are investigated in accordance with the detection criteria to determine the existence of local masking opportunities. The detection criterion or criteria may involve, for example, comparing the data point to a predetermined value and examining the relationship of the data point to nearby points. If the detection criteria are met, one or more of the nearby points, or the data point being investigated, is changed to indicate the value of an embedded bit of auxiliary data.

Thus, although the search for local masking opportunities typically progresses point by point through the data, the investigation of each point may include not only the value of that point, but also values of one or more nearby points and/or one or more relationships among the points. If the investigation of a point shows the existence of a local masking opportunity, data is embedded by setting the value of one or more of the local points, that is, either the point being investigated or one or more of the nearby points.

The value to which the nearby data points are set is typically dependent upon the data point being investigated as well as on the value of the auxiliary data bit. The data point value can be set so that it has a specified relationship with the neighboring data points. The process is continued until the original data has been traversed or no additional auxiliary data remains to be embedded.

Retrieving the auxiliary data is the inverse of the embedding process. The combined data is traversed using the detection criteria to locate the local masking opportunities. As each local masking opportunity is located, the nearby data point or points that was or were set to indicate the embedded bit is or are read to extract the embedded data. The process is continued until the combined data has been traversed.

In the preferred embodiments, a data point or points are set to a value relative to the nearby data points and not to an absolute value. Both setting data points at the local masking opportunity and setting the data point to a value related to the nearby points, rather than to a value unrelated to the original data, provide masking that reduces the perceptibility of the data. The data is extracted by determining the relationships or values of the point or points near the local masking opportunity.

For the two preferred embodiments described in detail below, only points with large values are adjusted, and by a minimal amount; thus, these embodiments are based upon the masking of a weak stimulus by an intense stimulus. The process is applicable to analog and digital data. However, both embodiments are explained in terms of digital media due to current switch to digital media and the ease of understanding.

Specifically, the first preferred embodiment uses the difference between a data point after a peak and the peak level to carry auxiliary information, as long as the peak is above a large threshold and the original difference between the peak and next point is not too great. This large threshold and minimal differences produce the desired perceptual masking. The embedding process adjusts the point after the above-threshold peaks to hide the auxiliary data. Correspondingly, the retrieving process measures the difference between each above threshold peak level and the next data point to retrieve the auxiliary data.

The second preferred embodiment uses the change in slope across a positive, large, steep, threshold crossing to hide the auxiliary information, as long as the original change in slope is not too great yet steep enough to accept the ensuing adjustment. Again, the large threshold produces the desired perceptual masking. In the implementation, the embedding process adjusts the change in slope to embed the data, whereas the retrieving process measures the change in slope to obtain the auxiliary data.

Usually, the preferred embedding process implicitly spreads the energy of the auxiliary information throughout the original data. This broadband approach produces data that is more difficult to remove than sub-band approaches that place the data in an inaudible in an inaudible frequency range. If desired, parameters can be chosen so that the process produces protected data that is statistically identical to unmarked data. Importantly, the process can be adjusted to produce the desired tradeoffs between perception, coding rate and robustness to attack.

Such embodiments of the invention preferably operate on the original data without requiring any complex data transformations, such as a Fourier transformation. Thus, if the original data represents information in the time domain, the data can remain in the time domain as the auxiliary data is embedded and retrieved. Of course, the invention can operate on original data of all types, such as in the frequency or time-frequency domain. For example, it can be applied to MPEG data, including the MPEG 1 and 2 specification, ISO 11172-3 and ISO 13818-7 respectively, herein by reference, which exists in the time-frequency domain.

Finally, the problem of bit-rate reducing techniques, known as compression, removing the watermark can be bypassed by using separate, but possibly identical, watermark procedures during the compression (a.k.a. encoding) and decompression (a.k.a. decoding) process.

In summary, the present invention has the advantage of being extremely efficient to implement while still maintaining a desired level of robustness, i.e., resistance to tampering, including non-LSB (least significant bit) capabilities and statistical invisibility. The efficiency of the present invention means that it is cheaper to implement and can be used to embed, retrieve and search more files than a computationally intense algorithm. Further objects and advantages will become apparent from a consideration of the ensuing description and drawings.

BRIEF DESCRIPTION OF THE DRAWINGS

FIG. 2 is a block diagram showing an apparatus used to embed or retrieve data using the process of FIG. 1.

FIG. 12 shows an embodiment of the apparatus of FIG. 2 for embedding data.

FIG. 13 is a block diagram showing an embodiment of the apparatus of FIG. 2 for retrieving the data.

DETAILED DESCRIPTION

The system according to a preferred embodiment of the present invention comprises a method and apparatus for hiding auxiliary information (or data) in original data and for retrieving the auxiliary information.

Figure 1:
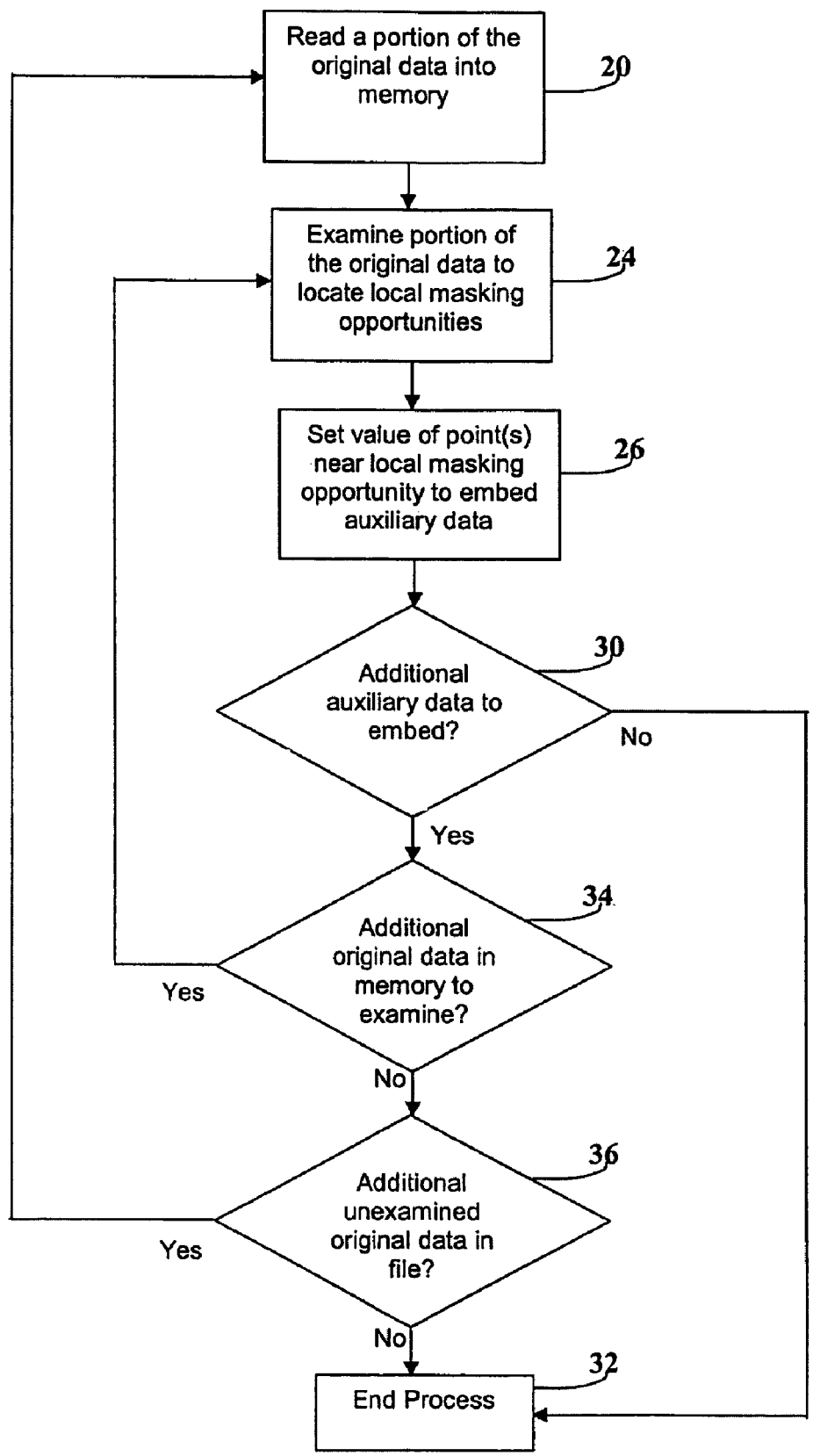
FIG. 1 is a flowchart showing, in general, the steps embedding data using the invention.

FIG. 1 is an overview of the steps involved in carrying out a method of the invention to embed data. FIG. 2 shows a block diagram of an apparatus 10 used to perform the method of FIG. 1. Apparatus 10 includes a logic processor 14, which can be a general purpose microprocessor, such as an Intel Pentium or DEC Alpha, of the type a personal computer or engineering workstation, a digital signal processor (DSP), such the hte Texas Instruments TMS320 line, a specialized CPU, such as a media processor, or a custom processing circuit. Apparatus 10 also includes a storage unit 18, which can include random access memory (RAM) or delays. Because the algorithms used by the invention are not computationally intense, they require calculations on the order of less than one million instructions per second and can be performed by most modern personal computers.

The original data mentioned below might represent sound that is recorded by sampling its amplitude periodically, with each sample using binary numbers to represent the magnitude of the sound at a particular time. Alternatively, the original data could be any series of binary data associated into groups. Similarly, the auxiliary information is any data that can be represented as "1"s and "0"s.

FIG. 1 shows that in step 20, a portion of the original data is read into storage unit 18 of FIG. 2. Step 24 shows that the sample data is investigated sequentially by the logic processor 14 to locate sample points that meet predefined detection criteria. Such sample points indicate the existence of "local masking opportunities," because the detection criteria are such that a change in the value of the sample or a few samples at or near that point to embed auxiliary data will usually have minimal perceivable by the listener of the sound. The amount of masking will depend upon the data type and settings chosen by the user. For example, the masking will be great for uncompressed audio and less for bit-rate reduced (digitally compressed) audio such as MPEG. The same detection criteria will be applied during data retrieval to locate the hidden data.

Each point in the original data is preferably investigated to determine whether it represents a local masking opportunity. The criterion or criteria for determining local masking opportunities may entail not only the value of the point being investigated, but may also include the value of at least one nearby or neighboring point, or the relationship between the nearby point and the point being investigated. The detection criteria can require, for example, that the point being investigated exceeds a certain threshold value and/or that the point be a local maximum or peak. The criteria may include a requirement that a point subsequent to the point being investigated have a value that differs from the point being investigated by less that a prescribed amount, or have some other relationship to the point being investigated.

The sample data points can be considered as plotted on a graph, for example with time on the x-axis and the and the magnitude of the sample on the y-axis. Thus, the series of data points can be considered as having a slope between any points, and the value of the slope can be part of the detection criteria. The criteria may specify, for example, that a slope defined by the point being investigated and a preceding point exceed a particular value, or that the change in slope before and after the point not exceeds a particular value. The criteria could include any combination of requirements. The threshold criteria can be changed to meet the needs of specific applications without departing from the concept of the invention.

In each case, no complex data transformation is required to mask the auxiliary data, so comparing a point to the detection criteria is relatively quick and inexpensive. Unlike prior art methods, which need to use distant points to convert the original data into the frequency domain to determine how to mask embedded data, the present invention can determines masking opportunities using only nearby or neighboring points, that is, points that are too close to use to determine useful frequency data. Nearby points including points that are next to the point being investigated or within a relatively small number of points, preferably less than 50 and more preferably less than 20. The criterion can be as simple as determining whether the point exceeds a threshold.

Step 26 shows that when a point meeting the detection criteria is located, the value of a specified sample point or sample points near the local masking opportunity is changed to reflect the value of the auxiliary information to be embedded. Although the changed sample may be simply set to a particular value to signify the value of the embedded bit, the new value typically depends upon the value of both the auxiliary data and the neighboring point or points that were investigated to detect the local masking opportunity. For example, the point may be set so that the change in value or slope signifies whether the embedded bit is a "1" or a "0".

When a point is set to its new value, it is important that either the change does not prevent the original sample point from continuing to meet the detection criteria, or that this local masking opportunity is skipped and not detected in the retrieval process. Otherwise, the embedded auxiliary data will not be retrievable.

Alternatively, it is possible to merely embed the auxiliary bit as the least significant bit, or other, preferably low order, bit. The embedded bit is still masked because the location of the embedded bit was chosen to represent a local masking opportunity, such as when the data is larger than a prescribed threshold.

Step 30 shows that the process is ended at step 32 if no additional auxiliary data needs to be embedded. Otherwise, step 34 shows that if there is additional data in memory, the search for local masking opportunities continues. Step 36 shows that if all data in memory has not yet been searched, additional data is read into memory. Skilled persons will recognize that some overlap of the data in memory is required to prevent missing local masking opportunities that occur at the beginning or end points of the data in memory.

Figure 3:
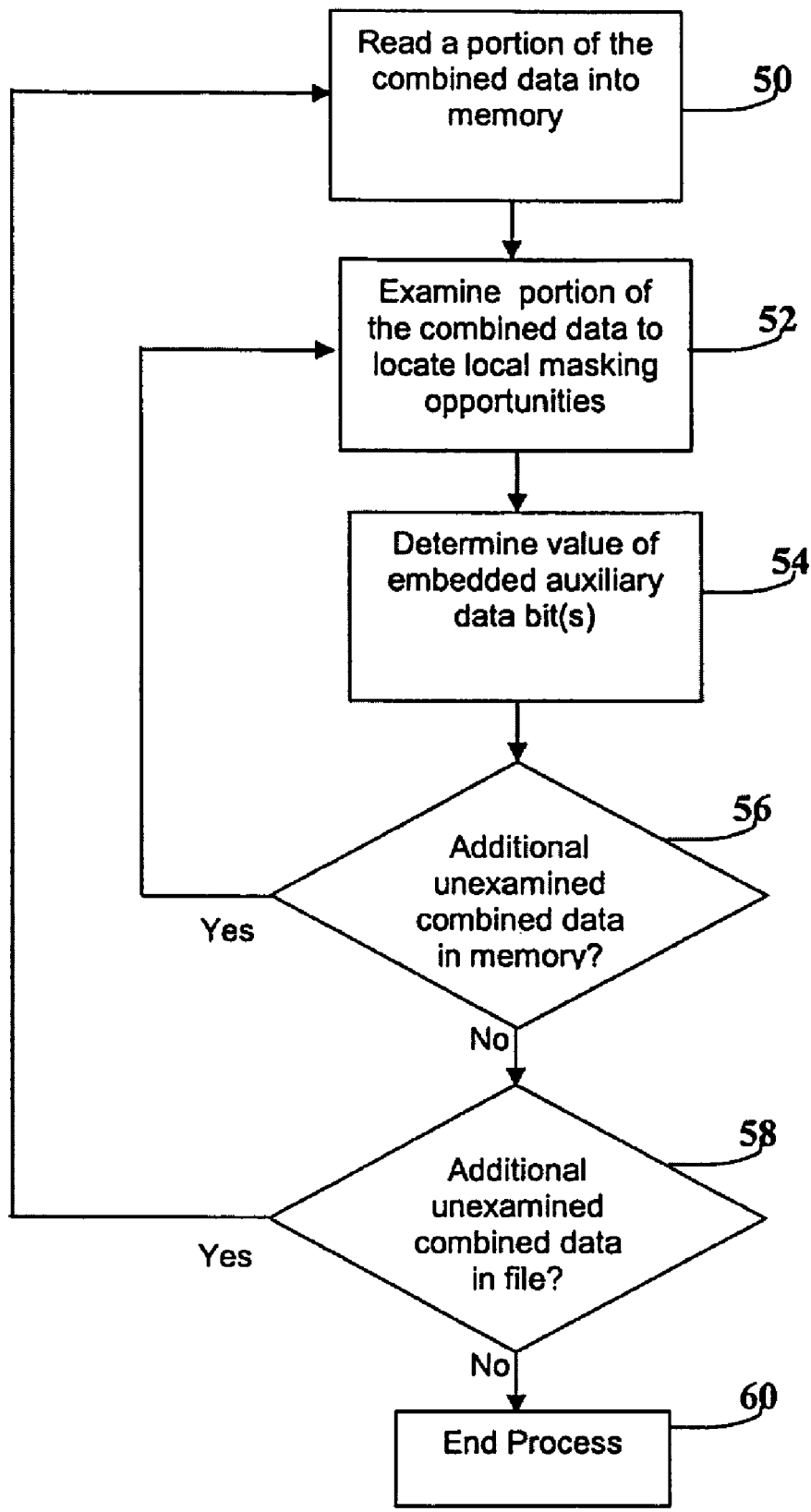
FIG. 3 is a flowchart showing, in general, the steps used to retrieve the data embedded using the process of FIG. 1.

FIG. 3 broadly shows the steps involved in carrying out a method of the invention to detect and retrieve the embedded auxiliary information. Because the same processor and memory that was used to embed the data can be used to retrieve the data, although not necessary, the steps of FIG. 3 will describe extracting data using data using the hardware components of FIG. 2. Step 50 shows that a portion of the original data is read into storage unit 18. Step 52 shows that logic processor 14 investigates each data point to determine the existence of a local masking opportunity. If a sample point meets the local masking opportunity criteria, step 54 shows that the embedded "1" or "0" bit of auxiliary data is extracted using the inverse relationship of how the auxiliary data was embedded. Step 56 shows that if additional combined data is in the memory, the logic processor continues to investigate the remaining points with step 52. Step 58 shows that if all the data in memory has been investigated, but there is uninvestigated combined data in the data file, additional data is read into memory in step 50. Step 60 shows that the process is ended when all the combined data has been investigated.

Figure 4:
FIG. 4 graphically displays the operation of a first embodiment of the invention.
Figure 7:
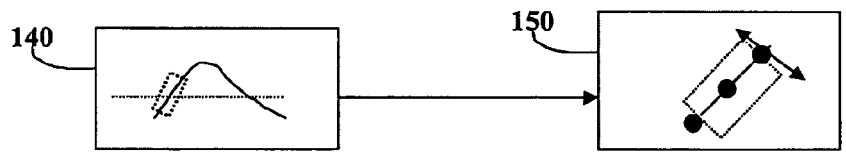
FIG. 7 graphically displays the operation of a second embodiment of the invention.

Two preferred embodiments are described briefly here, and in detail below, to demonstrate the flavor of this methodology. As shown in FIG. 4, the first embodiment uses large, positive peaks as the detection criteria 120 and the auxiliary information is stored in the difference 130 between the peak and the next point. As shown in FIG. 7, the second embodiment uses large, steep threshold crossings with minimal change in slope as the detection criteria 140, and the auxiliary information 150 is carried in the change in slope.

The methodology is applicable to analog or digital data, even though the preferred embodiments use digital data. For example, analog data can be sampled at the Nyquist rate to produce digital data in which additional information is hidden. Then, the combined digital data can be returned to the analog domain by any existing method known in digital signal processing (DSP). The analog data now contains the embedded data, which can be which can be decoded by using sampling. This is just one possible method to encode analog data with the above methodology.

The methodology is also applicable to audio, speech, images, video or any other perceivable signal. With audio and speech, the original data could represent pressure versus time, magnitude versus frequency, or a specific frequency magnitude versus time. With images, the original data could represent gray code versus space, separate or combined RGB or equivalent values versus space, or magnitude versus frequency. Video data encompasses the image data with an added dimension of time available. For example, with MPEG bit-reduced audio or images the auxiliary data could be embedded in scaling factors or frequency coefficients versus frequency or time or both.

Usually one of the detection criteria is a large threshold. With 16 bit audio, a threshold greater than 48 dB above the minimum value is desirable. This threshold allows the data to be changed with minimal perception due to masking. Masking is the psychological term defined as the increase in threshold for steady-state stimuli. Use of the term in this invention is much broader than that definition, and describes how one set of data reduces the perception of other data. Specifically, for uncompressed, magnitude-time data, the sensitivity of the sensory system decreases with increased input level, thus the small adjustment of an neighboring data point is masked by the large value of the threshold. For bit-rate reduced, time-frequency data, such as MPEG data, the masking is minimal and more similar to the textbook definition since masking has been used to reduce the bit rate.

Finally, this method is applicable to data where masking is not used, but the efficiency of the process in that it is does not require a key, such as a PN sequence, or original data for retrieval of the auxiliary information, is an advantage. In summary, the parameters of the detection criteria will determine the interaction between the data rate, process complexity and perceptual quality.

Embodiment 1

The first preferred embodiment is based upon hiding the auxiliary information in large peaks within the original data. In this embodiment, the auxiliary information is preferably broken into N bit words, with synchronization data placed between the words for better error recovery. The auxiliary information does not need to include sync pulses between the words if robustness to noise or modified files is not needed.

FIG. 4 conceptually shows that the first embodiment detects a peak or local maximum and sets the value of the subsequent point in relation to the peak to indicate the value of the embedded bit.

Figure 5:
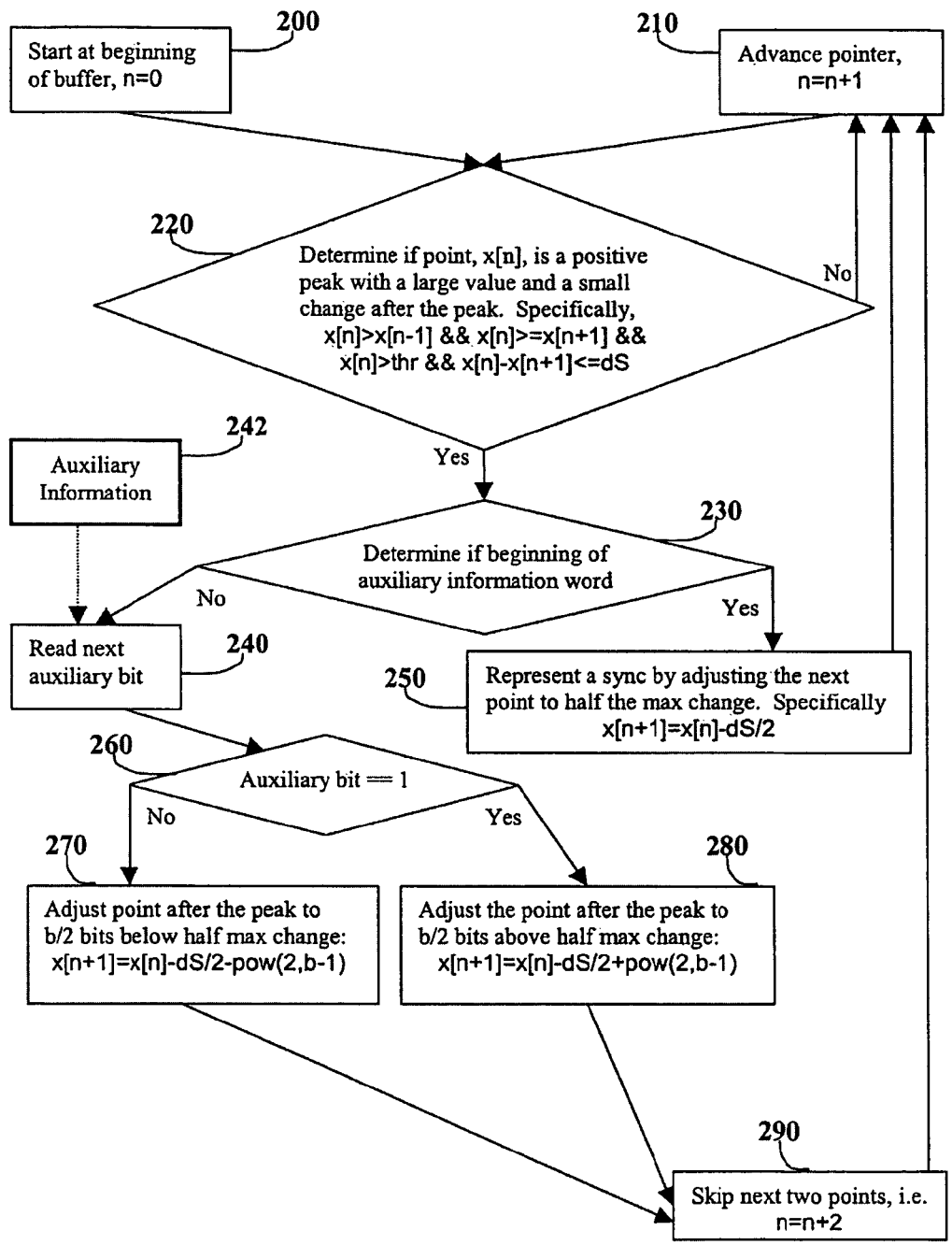
FIG. 5 is a flowchart showing the steps of embedding data in accordance with the first embodiment of the invention. The dashed lines show interaction with the auxiliary data.

FIG. 5 includes the pseudocode in the form of a flowchart for the embedding process. The process begins by searching the original data until a positive peak that lies above a large threshold, labeled thr, and has a relatively small decrease after the peak, labeled dS, is found. This process is demonstrated in boxes 200, 210 and 220. The detection criteria are checked in the most computationally efficient order, which includes first checking to see if the point represent a peak since peaks are the least likely criterion.

When a desirable peak is found, the data point after the peak is adjusted according to a user defined bit depth, b, to carry the auxiliary information. Specifically, if it is the beginning of an auxiliary word, the synchronization code is embedded by adjusting the point after the peak, $x[n+1]$, to be equal to the peak, $x[n]$, minus half of the maximum allowable change, $dS/2$, between the peak and the next point, as shown in boxes 242, 230 and 250. An auxiliary information bit of one is encoded by adjusting the point after the peak, $x[n+1]$, to be equal to the peak, $x[n]$, minus half the maximum change, $dS/2$, and plus the half the bit depth magnitude, $2^{b-1}$. Correspondingly, an auxiliary information bit of zero is encoded by adjusting the point after the peak, $x[n+1]$, to be equal to the peak, $x[n]$, minus the sum of half the maximum change, $dS/2$, and half the bit depth magnitude, $2^{b-1}$. This embedding of zeros and ones is shown in boxes 242, 240, 260, 270 and 280. The next two points after embedding the data should be skipped so one does not create another peak for very slow changing (i.e. flat) data, as shown in box 290.

These steps are repeated until the auxiliary information, box 242 and 240, has been hidden in the original data or the original data is finished.

Figure 6:
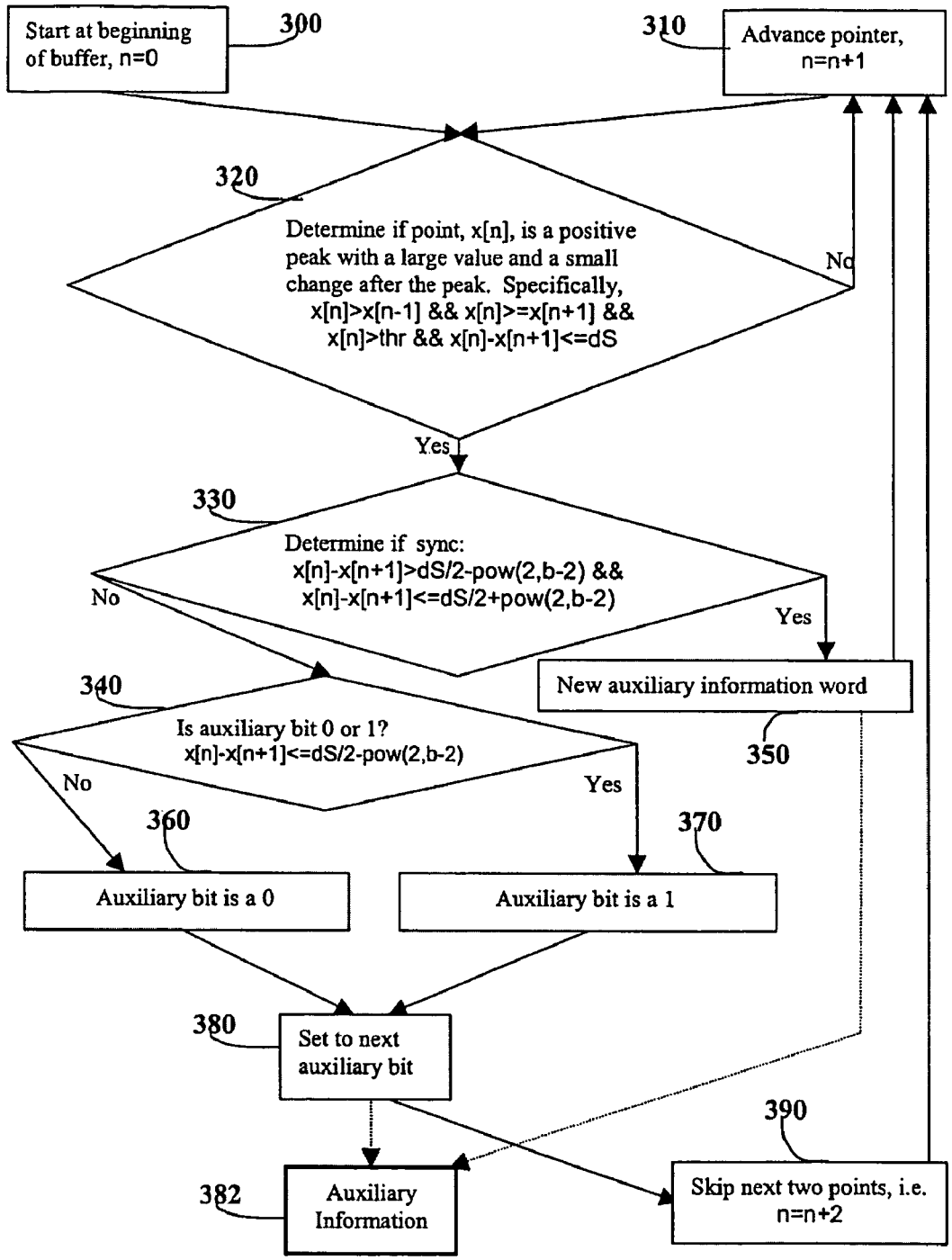
FIG. 6 is a flowchart showing the steps of retrieving data that was encoded in accordance with the embodiment shown in FIG. 5. The dashed lines show interaction with the auxiliary data.

FIG. 6 displays the pseudocode in the form of a flowchart for the retrieval process of the first preferred embodiment. The process begins by searching the original data is searched until a positive peak that lies above a large threshold, labeled thr, and has a relatively small decrease after the peak, labeled dS, is found. This process is demonstrated in boxes 300, 310 and 320. Again, the search first looks for a peak to improve efficiency.

When a desirable peak is found, the difference between the peak and the data point after the peak is measured to retrieve the auxiliary information. Specifically, if the peak minus the point after the peak, $x[n]-x[n+1]$, is close to half of the maximum allowable change, $dS/2$, a new auxiliary word is beginning, as shown in boxes 330 and 350. If the peak minus the point after the peak, $x[n]-x[n+1]$, is approximately equal to half the maximum change, $dS/2$, minus half the bit depth magnitude, $2^{b-1}$, an auxiliary bit of one is found. If this difference, $x[n]-x[n+1]$, is close to the sum of half the maximum change, $dS/2$, and half the bit depth magnitude, $2^{b-1}$, an auxiliary bit of zero is retrieved. This retrieving of zeros and ones is shown in boxes 340, 360, 370, 380, and 382. The two points immediately after retrieving the data can be skipped as shown in box 390.

These steps are repeated until the auxiliary information has been retrieved in the original data or the original data is finished.

There are three user-defined parameters, including threshold, thr; bit depth, b; and maximum allowable change after the slope, dS. For 16 bit audio, the threshold is usually around 48 dB above the minimal quantization, as discussed above. For data with more bits per sample, the threshold may be increased to reduce perception. The bit depth is an indication of the relative change to be made to the sample point to embed the data. Thus, the smaller the bit depth, the less disturbance of the original data, making the embedded data less perceptible to the listener, but less robust, that is, more susceptible to being lost to noise or attack. Minimal perception in 16 bit audio is found when bit depths are between 1 and 6 bits. However, higher bit depths can be used if one desires more robustness to noise in trade for more perceptual degradation. The maximum allowable change after the peak, dS, must be at least the desired bit depth magnitude, $2^b$. On the one hand, one can gain better robustness to noise at the expense of more distortion, if dS is set to twice the bit depth magnitude, $2^{b+1}$. On the other hand, if one desires to keep the threshold undetectable to statistical cryptoanalysis (labeled statistically invisible), dS should be set at $2^b$, and b should be small, probably below 3 bits. If dS is not $2^b$, one can use the discrepancy of the average difference between large positive peaks and their next points between embedded file and regular file data to determine if the file contains embedded data or not. Finally, if dS is much greater than $2^b$, the auxiliary information embedding rate will be increased, because more peaks will be found suitable for data embedding. Using the principles explained above, skilled persons will be able to set the user-defined parameters to values appropriate to the requirements of a particular application.

As discussed above, the large threshold usually reduces the perceivable effect of adding the auxiliary information, and may even cause the auxiliary data to be non-perceivable, depending upon the data type. In addition, many data points satisfy the small difference between the peak and data point after the peak, because with a slope near 0 at the peak, the data is changing the least. This small difference means that the adjustment will be small as compared to the threshold, thus reducing the chance of perceiving the embedded auxiliary data The pseudocode is shown using a buffer with what appears to be look ahead capabilities (i.e. x[n+1]). This makes the process easier to explain and understand. However, the process is causal, as determined by replacing n+1 with k, and keeping track of the last two points, x[k−1] and x[k−2].

Finally, one can add more criteria to define the peak. For example, the peak extends for one more point each direction where x[n]>x[n−2], x[n]>x[n+2], x[n]>x[n−3], x[n]>x[n+3], and so on, or the peak is of minimal sharpness, i.e. x[n]−x[n−1]>5. Both of these criteria produce better robustness to noise and less distortion since it will take more noise to move the location of the peak, although changes in the peak criteria affect the rate at which auxiliary data can be embedded.

The embedded data density and bit rate will vary with the original data and with the user-defined parameters. For example, bit rates of between 99 and 268 bits per second were achieved in CD quality audio data using a bit depth of 5 and a threshold of 5,000 (74 dB). Using a bit depth of 8 and maintaining a threshold at 5,000, the average embedding rate was 1,000 bits per second. When the threshold is lowed to 2,000 at a bit depth of 8, an average embedding rate of 2,000 bits per second was found.

Embodiment 2

The second preferred embodiment hides the auxiliary information in large, steep threshold crossings which do not have a large change in slope. The method is more robust to noise changing the detected location. This occurs because it is less likely that noise changes the location of a threshold crossing as compared to a peak, since a threshold crossing usually has a slope larger than the slope at the peak, which, by definition, has a slope near zero. Testing with audio data has shown this embodiment, as compared to the first embodiment, to produce a lower embedded data rate and is more perceivable at a lower bit depth, in trade for the robustness to noise. One will probably find the optimal embodiment dependent upon the application.
upon the application.

FIG. 7 conceptually shows that data is embedded by setting the slope after the threshold crossing in relation to the slope at the threshold crossing.

Figure 8:
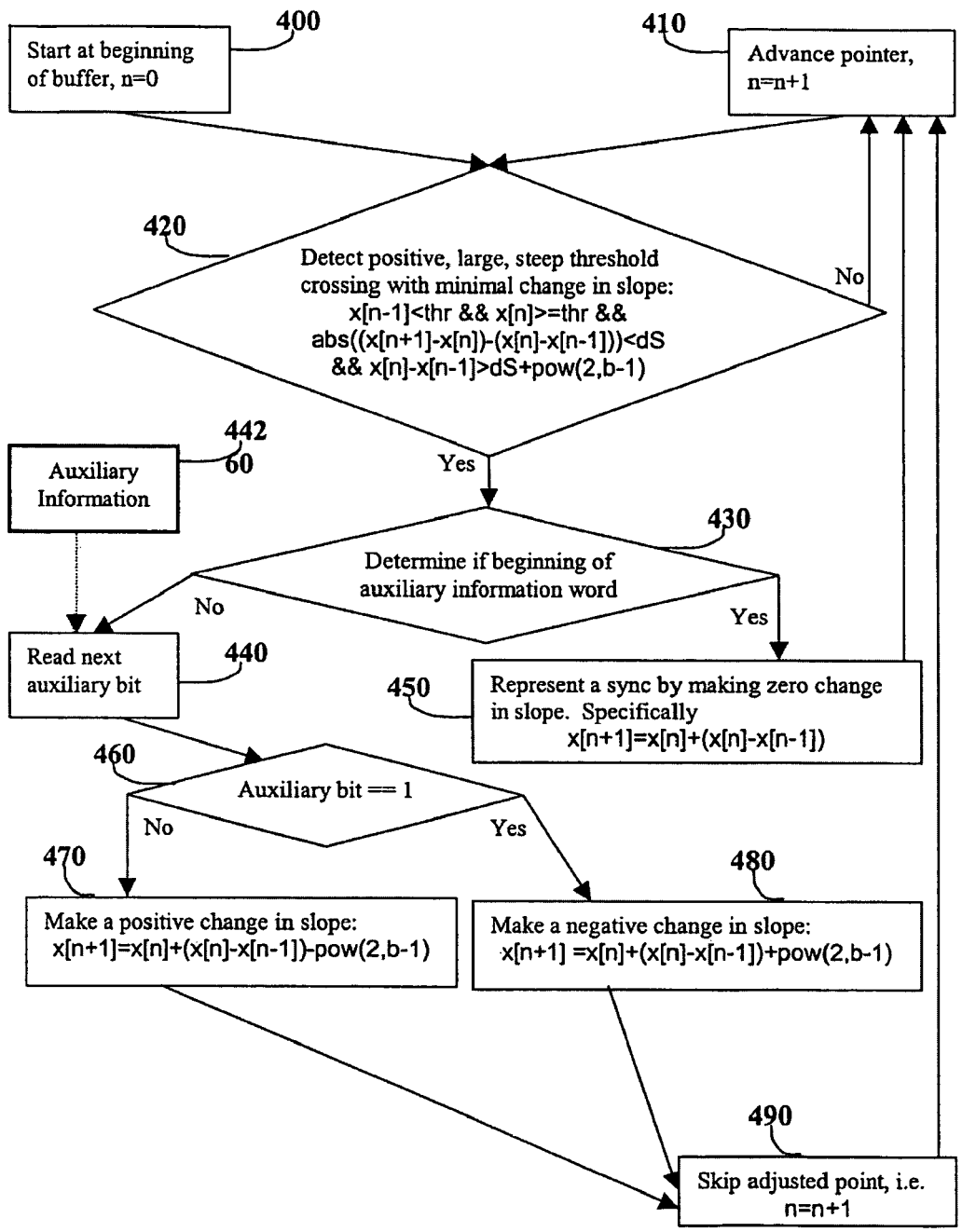
FIG. 8 is a flowchart showing the steps of embedding data in accordance with a second embodiment of the invention. The dashed lines show interaction with the auxiliary data.

In FIG. 8, the pseudocode for hiding the auxiliary information using the second preferred embodiment is presented in the form of a flow chart. The process begins by searching the original data until a positive, large, steep threshold (labeled thr) crossing with minimal change in slope (labeled dS) is found. This process is demonstrated in boxes 400, 410 and 420.

When the desirable threshold crossing is found, the data point after the threshold crossing is adjusted according to a user defined bit depth (b) to carry the auxiliary information in the change in slope. Note that the change in slope is defined as (x[n+1]−x[n])−(x[n]−x[n−1]), or equivalently as x[n+1]−2*x[n]+x[n−1]. Specifically, if it is the beginning of an auxiliary word, the synchronization code is embedded by adjusting the point after the threshold crossing, x[n+1], so that the change in slope is zero, as shown in boxes 442, 430 and 450. An auxiliary bit of one is encoded by adjusting the point after the threshold crossing, x[n+1], so that the change in slope is positive by an amount equal to half the bit depth magnitude, $2^{b-1}$. Correspondingly, an auxiliary bit of zero is encoded by adjusting the point after the threshold crossing so that the change in slope is negative by an amount equal to half the bit depth magnitude, $2^{b-1}$. This embedding of zeros and ones is shown in boxes 442, 440, 460, 470 and 480. The point after embedding the data can be skipped for efficiency as shown in box 490.

These steps are repeated until the auxiliary information has been hidden in the original data or the original data is finished.

Figure 9:
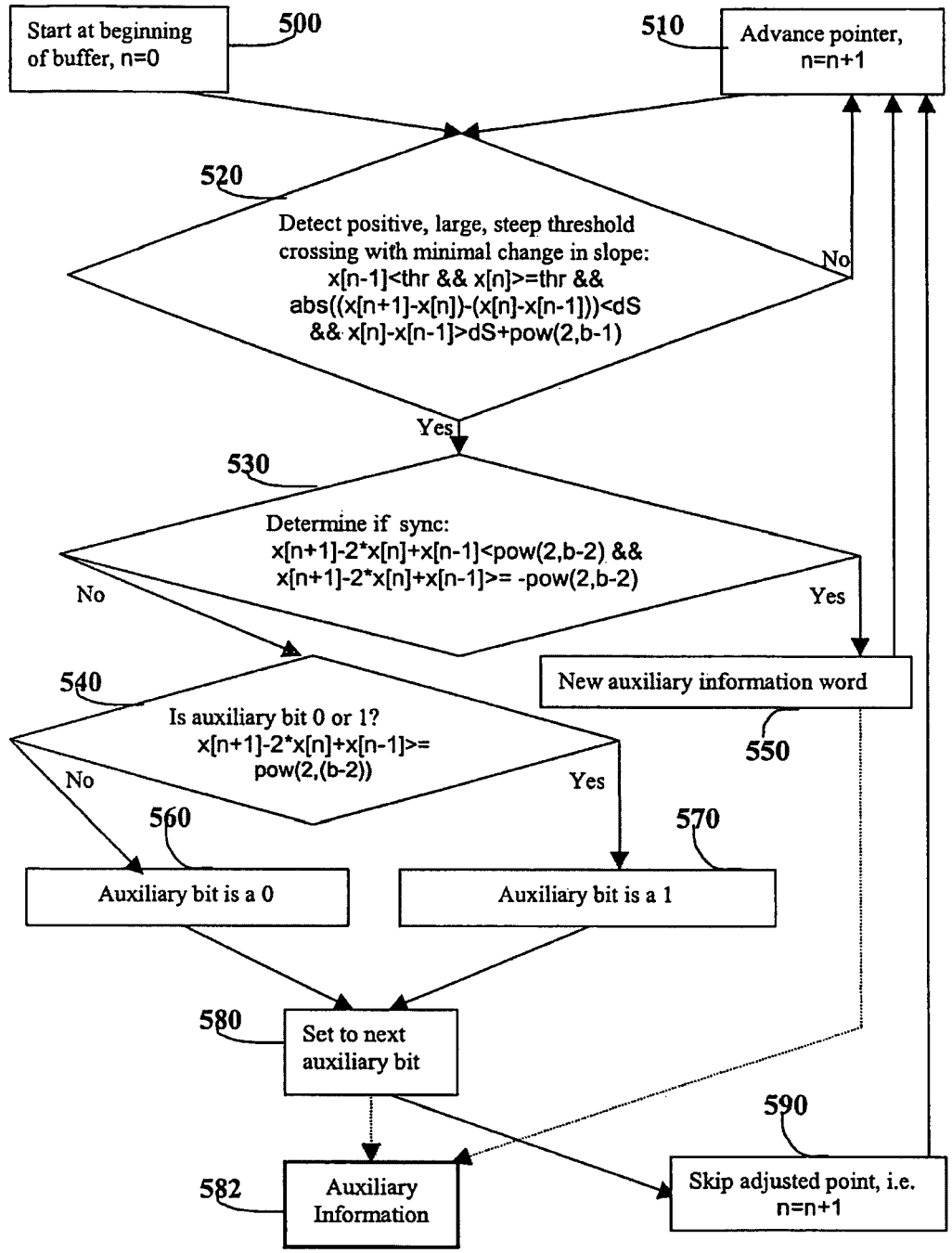
FIG. 9 is a flowchart showing the steps of retrieving data that was encoded in accordance with the embodiment shown in FIG. 8. The dashed lines show interaction with the auxiliary data.

FIG. 9 shows the pseudocode in the form of a flowchart for the retrieval of the auxiliary information in the second preferred embodiment. The process begins by searching the original data until a positive, large, steep threshold (labeled thr) crossing with minimal change in slope (labeled dS), is found. This process is demonstrated in boxes 500, 510 and 520.

When a desirable threshold crossing is found, the change in slope around the threshold is measured to retrieve the auxiliary information. Again, the change in slope is defined as (x[n+1]−x[n])−(x[n]−x[n−1]), or equivalently as x[n+1]−2*x[n]+x[n−1]. Specifically, if the threshold crossing has almost zero change in slope, a new auxiliary word is begun, as shown in boxes 530 and 550. If the threshold crossing has a positive change in slope approximately equal to half the bit depth magnitude, $2^{b-1}$, an auxiliary bit of one is found. If the threshold crossing has a negative change in slope approximately equal to half the bit depth magnitude, $2^{b-1}$, an auxiliary bit of zero is retrieved. This retrieving of zeros and ones is shown in boxes 540, 560, 570, 580, and 582. The point after retrieving the data can be skipped for efficiency as shown in box 590.

These steps are repeated until the auxiliary information has been retrieved in the original data or the original data is finished.

As mentioned above, one does not want the embedding process to eliminate the embedded location from fulfilling the detection criteria. Specifically, in this embodiment, the pre-threshold change condition, $x[n]-x[n-1]>dS+2^{b-1}$, in the detection criteria of box 420 and 520 requires that the adjustment of the next data point does not bring the point back below the threshold. An alternative approach, is to ignore this condition and condition and to set either the current or next point (x[n] or x[n+1], respectively) to the threshold if the embedding process would cause the next point to move below the threshold, and ignore any data points that are equal to the threshold in both the embedding and retrieving process. Interestingly, only when embedding a sync or 0 could the next point move below the threshold. Given these options, the described embodiment is chosen so the process is causal, thus incorporating the known advantages of causal processes.

Once again, the large threshold and maximum allowable change in slope condition, dS, reduce the perception of embedding the auxiliary data, and depending upon the data type can cause the embedding process to be completely non-perceivable. The maximum allowable change in slope condition, dS, can have any value. A larger value allows a higher data rate with more perceivable distortion, whereas a smaller value produces minimal distortion with a lower data rate. Our preferred setting for dS in 16 bit audio is equal to the bit depth magnitude, $2^b$. Again, bit depths below 6 bits produce minimal distortion, but higher bit depths can be used for robustness to noise and attack.

Using a threshold of 2,000 (i.e. 66 dB) and a bit depth of 5, data rates between 40-100 bits per second are expected, with an average of about 75 bits per second, for CD quality audio. At a bit depth of 8, the bit rate increases to an average of 100 bits per second.

Modifications

The preferred embodiments have been described in detail above. However, there are many simple modifications that can be made to optimize the process for each use. Thus, these modifications and many similar ones produce a process that is equivalent to the one taught in this disclosure.

In some applications, a very simple embodiment could use a simple threshold to determine a local masking opportunity and then encode the auxiliary data in the LSB of the point exceeding the threshold or of another point in the vicinity of the point exceeding the threshold. Such a variation is extremely simple, yet provides reduced perceptibility compared to prior art LSB schemes. As with the other embodiments, one must ensure that changing the value does not remove the point for the detection criterion. In this case, one could simply skip embedding where the change brings the data below the threshold, and change the current value of the data point to the threshold so that the data point will be skipped in the retrieving phase.

To increase the robustness of the invention to attack or noise, the following changes could be made. (Attack is defined as a person or machine trying to remove the auxiliary information from the combined signal without distorting the perception of the original data.)

Using a dynamic threshold can make it harder to remove the auxiliary information. An example dynamic threshold is an offset sinusoidal waveform. When using a dynamic threshold, dS should be small and close to $2^b$ so that the process does not change the distribution of the differences between neighboring points, i.e. be statistically invisible; thus, an attacker cannot use this data to find the threshold.

One can also use the statistical gaps when dS is larger than $2^b$ to find the threshold if the attack uses a DC shift. A DC shift is obviously a more potent attack for the second preferred embodiment than the first, but could affect the first preferred embodiment since threshold is one of the detection criteria.

The process could use more global definitions for peaks and threshold crossings, for better robustness to noise. Specifically, a peak or threshold crossing definition that includes more points on each side.

Finally, the process can use any type of error correction in the auxiliary information to increase the robustness.

To increase the data rate, the following changes could be made. The auxiliary information does not need to include the extra sync pulses between the N-bit words, especially if robustness to noise is not needed. In addition, negative going peaks and/or more thresholds can be used to increase bit rate. Finally, the process can use more than a binary system in adjusting the second bit to encode more information. However, the result is more likely to be perceivable or less robust to attack.

An interesting twist is to embed different auxiliary information on positive and negative peaks, and/or on various thresholds. In addition, with stereo files, you can code the channels separately or move between channels with consecutive points moving between left and right channels.

A change that could improve the perception is to move the data point after the embedded point towards the value of the embedded point if combining the auxiliary information causes a large value change in the embedded point.

As mentioned above, the data does not have to be relative to time. For example, the data could represent magnitude versus frequency. In addition, the data could be viewed as magnitude of a specific frequency versus time. You could include all frequencies for an increased data rate. In other words, you could embed in words, you could embed in the spectrum or spectrogram. Advantageously, you don't have to change the format of the given data to use this process and corresponding apparatus.

For example, for bit-reduced data, such as MPEG compressed data. MPEG-compressed data comprises a series of data points that represent scaling factors and frequency coefficients. The invention could embed auxiliary data in the series of MPEG data points, using, for example, one of the two embodiments described above. When using the first preferred embodiment, one may want to increase the peak or modify its LSB such that the term is only increased, rather than decrease the point after the peak, such that quantization error is not increased in the MPEG data, especially when dealing with scaling factors. Skilled persons will recognize that, in using data like MPEG data that is divided into time frames, one could use, for example, scaling factors or frequency coefficients from consecutive frames, as well as data points representing scaling factors and coefficients of different frequencies within a frame, when determining where to embed data. For example, the coefficients for a particular frequency in consecutive frames could be considered as a series of consecutive data points, and those data points analyzed in accordance one of the embodiments above to determine where to embed data in the series. In an alternative example, the series of data points representing scaling factors or frequency coefficients for different frequencies within a frame can be analyzed in accordance with the first or second embodiment above to decide where to embed data.

The benefits of the inventions can be obtained using any series of data points, which can be analyzed to determine where to embed data, although the degree of masking may vary depending upon what the data points represent.

Example Utilizations

Below are included some example utilizations of the algorithm to aid in its understanding. This list is not complete, and only highlights the usefulness of the invention. The invention in its various forms is useful in any application in which it is desirable to embed auxiliary data into original data in a minimally perceptible or imperceptible manner.

The process can be used to embed copyright information. This information could include a code to determine if the data can be copied. Copying devices, such as CD writers, could include an inexpensive integrated circuit that could interpret to embedded data and prohibit copying.

In addition, author's or artist's name and affiliation can be embedded. In this utilization, the auxiliary information is small and would be repeated over and over with synchronization pulses between each duplication. Alternatively, the copy code could be embedded using embodiment 1, and the creator's name and affiliation using embodiment 2.

The invention can also be used to send additional information. This information could be transmitted in ASCII or ANSI with 8 bit "words" (not to be included with digital words being defined as 32 bits) and synchronization pulses between these words, if desired. The information could be a secret message, lyrics to the song, or a description of the artwork. For lyrics, this could be useful for karaoke machines and CD or DVD players.

Digital Compression

The main problem with hiding data and digital compression (reducing bit rate not dynamic range) is that the process of hiding data is incompatible with digital bit-rate reducing techniques known as compression (a.k.a. encoding and decoding). This incompatibility occurs since the goal of data hiding is to make the data minimally perceivable and the goal of compression is to remove minimally perceivable parts.

Figure 10A:
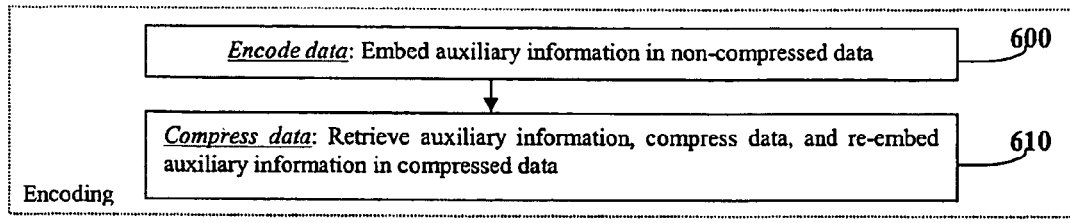
FIG. 10 demonstrates the operation of the invention in conjunction with digital compression techniques.

To this end, FIGS. 10A and B demonstrates the process for data hiding, if at some point the data must be compressed. For example, this may happen while transmitting the data.

In FIG. 10A, the auxiliary information is embedded in the non-compressed data using the described invented process or any other appropriate method, as shown in box 600. Then, when the data needs to be compressed, the auxiliary information is retrieved via the described invention or the other appropriate method, and re-embedded in the compressed data with the described invented process or the other appropriate scheme, as shown in box 610. The algorithm for data hiding in the compressed and non-compressed data may be the same algorithm, differing by only using different original data.

Figure 10B:
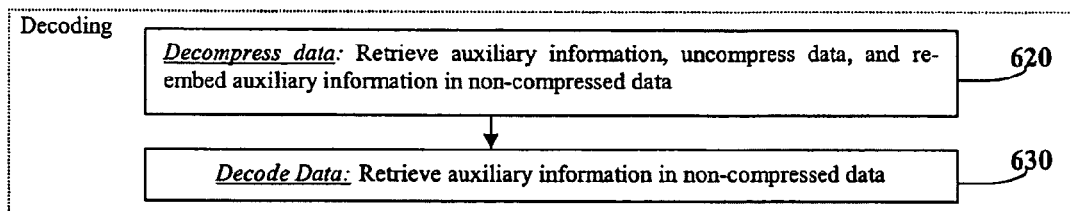

In FIG. 10B, the auxiliary information is retrieved from the compressed data using the described invented process or any other appropriate algorithm, the data is uncompressed, and the auxiliary information is embedded in the uncompressed data using the described invention or the other appropriate process, as shown in box 620. Finally, when needed, the auxiliary information can be retrieved from the data using the described invention or the other appropriate algorithm, as shown in 630. Once again, the algorithm for data hiding in the compressed for data hiding in the compressed and non-compressed data may be the same algorithm, differing by only using different original data.

Apparatus

As described above, FIG. 2 demonstrates that the invented process can be implemented via logic processor and storage unit 18. FIG. 12 shows the implementation with a digital processor 1200 and digital memory 1210. The digital processor 1200 may be defined as the equivalent of a digital signal processor (DSP), general-purpose central processing unit (CPU), or a specialized CPU, including media processors. A likely DSP chip is one of the Texas Instruments TMS320 product line. A CPU could include one of Intel's Pentium line or Motorola/IBM's PowerPC product line. The design is straightforward for someone familiar with the state of the art given the pseudocode in FIGS. 5 through 9.

In addition, as shown in FIG. 13, a person familiar with the state of the art could implement the process with analog and digital circuitry, either separate or in an application specific integrated circuit (ASIC). The analog and digital circuitry could include any combination of the following devices: a digital-to-analog converter (D/A), comparators, sample-and-hold circuits, delay elements, analog-to-digital converter (A/D), and programmable logic controllers (PLC). Someone familiar with the state of the art given the previous description and pseudocode in FIGS. 5 through 9 could easily design the circuit.

Figure 11A:
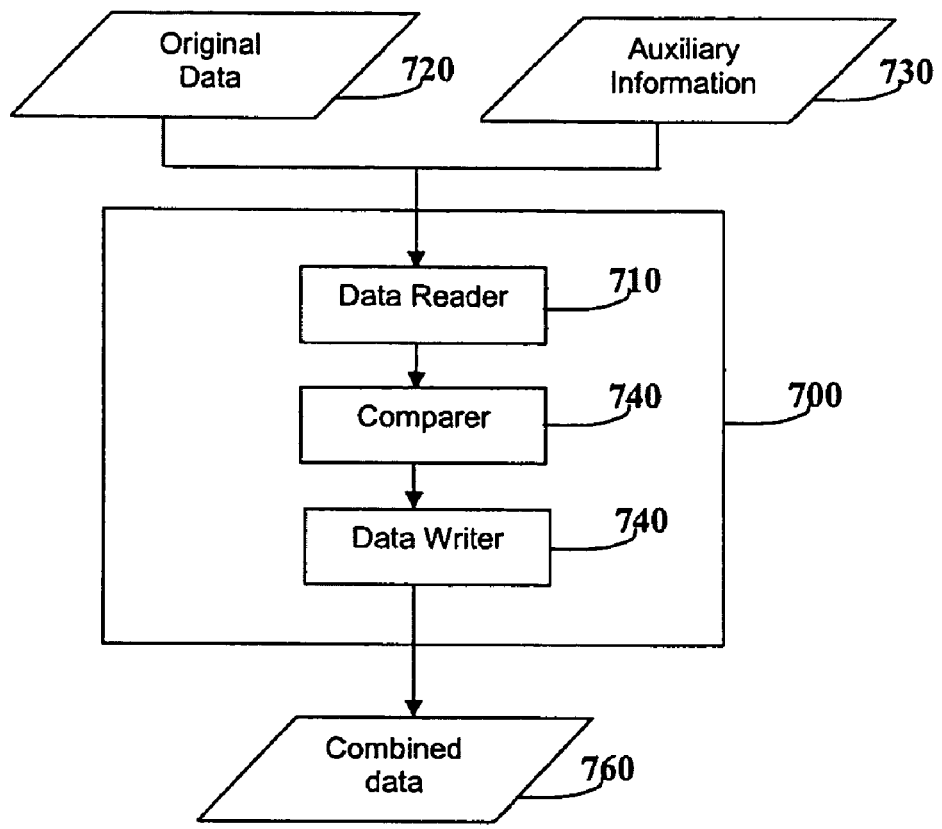
FIGS. 11 A and B are two block diagrams showing an embedding and retrieving apparatus used to carry out the invention.
Figure 11B:
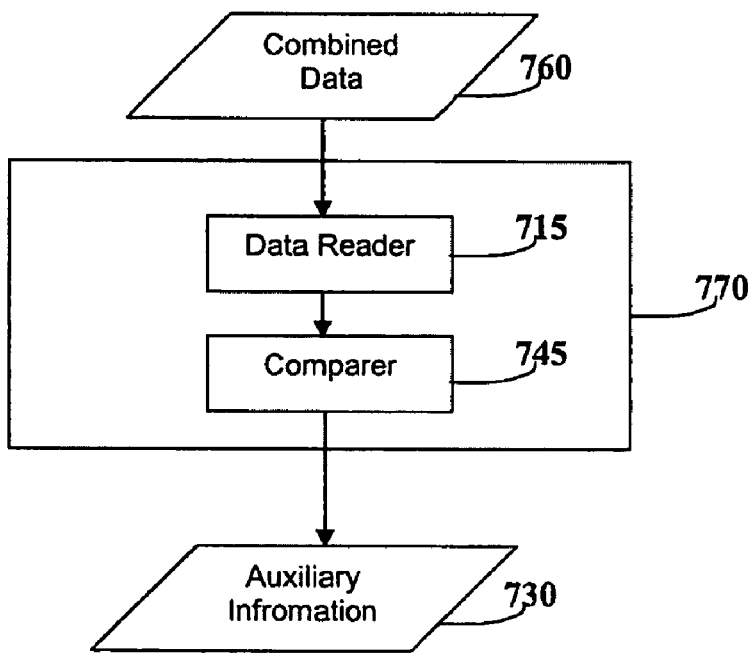

FIGS. 11A and B show that the logic processor and storage unit typically comprise an embedding apparatus 700 and retrieving apparatus 770. The embedding apparatus 700 includes the following. A data reader 710 to read original data 720 and auxiliary data 730. A A comparer 740, that is, a circuit or device for comparing data points with known values or other data points. A data writer 750 to write the combined data 760 to a permanent or temporary storage media.

The retrieving apparatus 770 includes the following. A data reader 715 to read the combined data. The data reader 715 may be identical to the embedding data reader 710, but it also may be different. A comparer 745, that is, a circuit or device for comparing data points with known values or other data points and, if necessary, producing the auxiliary bit or bits. Once again the comparer 745 may be identical or different that the embedding comparer 740. A data writer is not always necessary since the auxiliary information may be taken from memory or only displayed for the corresponding use.

CONCLUSIONS, RAMIFICATIONS AND SCOPE

As the reader can see from the description above and determined from testing the process with CD quality audio, this process and apparatus of hiding auxiliary information within original data is extremely efficient and has configurations which are non-perceivable. These advantages are mainly due to the invented process finding locations to hide the auxiliary data without needing to transform the signal to the frequency domain and where masking may block or reduce the perception of the auxiliary data.

The foregoing descriptions of the preferred embodiments of the invention have been presented to teach those skilled in the art how to best utilize the invention. Many modifications and variations are possible in light of the above teaching. For example, as discussed above, the peak criteria can be extended, the threshold may be dynamic, synchronization codes, error correcting codes, and any combination of peaks and threshold can be used jointly. To this end, the following claims define the scope and spirit of the invention.

What is claimed is:

1. A method comprising:
utilizing an electronic processor programmed for transmarking a media signal by acts of: detecting a first digital watermark in the media signal, the media signal being embedded with the first digital watermark using a first digital watermark embedding method; embedding detected message information from the first digital watermark into a second digital watermark in the media signal before the media signal undergoes a transformation process such that the second digital watermark is adapted to survive the transformation process.

2. The method of claim 1 wherein the second digital watermark is increased in amplitude relative to the first digital watermark to survive the transformation process.

3. The method of claim 1 wherein the second digital watermark is embedded using a different steganographic embedding method than the first digital watermark embedding method.

4. The method of claim 1 wherein the first digital watermark is partially removed before embedding the second digital watermark.

5. The method of claim 1 wherein the message information includes message symbols and further including: decoding the message symbols from the first watermark; and re-embedding the decoded message symbols from the first watermark into the second watermark.

6. The method of claim 5 wherein the message symbols include an index to a database entry that stores information about the media signal.

7. The method of claim 5 wherein the message symbols include a content identifier.

8. A non-transitory computer readable medium comprising instructions stored thereon to cause an electronic processor to perform the acts recited in claim 1.

9. A programmed computing device comprising instructions stored in memory, said instructions comprising instructions to cause said programmed computing device to perform the acts recited in claim 1.

10. A method of transmarking a media signal previously embedded with a first digital watermark using a first digital watermark embedding method, comprising: utilizing a programmed electronic processor, detecting the first digital watermark in the media signal; converting the media signal to a different format; utilizing a programmed electronic processor, embedding detected message information from the first digital watermark into a second digital watermark in the converted media signal such that the second digital watermark is adapted to robustness or perceptibility parameters associated with the new format.

11. The method of claim 10 wherein the new format is a compressed format of the media signal.

12. The method of claim 10 wherein the second digital watermark is encoded with greater signal strength than the first digital watermark to survive transformation of the media signal in the new format.

13. The method of claim 10 wherein the second digital watermark is encoded with lesser signal strength than the first digital watermark so as to be less perceptible in the new format of the media signal.

14. The method of claim 10 wherein the first digital watermark is removed before converting the media signal to the different format.

15. A non-transitory computer readable medium comprising instructions stored thereon to cause an electronic processor to perform the acts recited in claim 10.

16. A programmed computing device comprising instructions stored in memory, said instructions comprising instructions to cause said programmed computing device to perform the acts recited in claim 10.

17. An apparatus comprising: means for transmarking a media signal including: means for detecting a first digital watermark in the media signal, the media signal being embedded with the first digital watermark using a first digital watermark embedding method; means for embedding detected message information from the first digital watermark into a second digital watermark in the media signal before the media signal undergoes a transformation process such that the second digital watermark is adapted to survive the transformation process.

18. An apparatus for transmarking a media signal previously embedded with a first digital watermark using a first digital watermark embedding method, said apparatus comprising: means for detecting the first digital watermark in the media signal; means for converting the media signal to a different format; means for embedding detected message information from the first digital watermark into a second digital watermark in the converted media signal such that the second digital watermark is adapted to robustness or perceptibility parameters associated with the new format.

* * * * *